US006892233B1

(12) United States Patent
Christian et al.

(10) Patent No.: US 6,892,233 B1
(45) Date of Patent: May 10, 2005

(54) OPTICAL COMMUNICATION NETWORK AND METHOD OF REMOTELY MANAGING MULTIPLEXERS

(75) Inventors: Philip J. Christian, Bishop's Stortford (GB); Chris Ramsden, Hertford (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/565,700

(22) Filed: May 4, 2000

(51) Int. Cl.[7] .............................................. G06F 15/173

(52) U.S. Cl. ....................... 709/223; 709/221; 709/227; 709/228; 709/229; 709/230

(58) Field of Search ................................. 709/227, 228, 709/229, 202, 203, 223, 224, 230, 221

(56) References Cited

U.S. PATENT DOCUMENTS

| | | | | | |
|---|---|---|---|---|---|
| 5,870,558 | A | * | 2/1999 | Branton et al. ............. | 709/224 |
| 6,073,174 | A | * | 6/2000 | Montgomerie et al. ...... | 709/224 |
| 6,173,323 | B1 | * | 1/2001 | Moghe ........................ | 709/224 |
| 6,292,485 | B1 | * | 9/2001 | Trotta et al. ................ | 370/389 |
| 6,317,236 | B1 | * | 11/2001 | Saunders ..................... | 398/98 |
| 6,323,881 | B1 | * | 11/2001 | Broulik et al. .............. | 345/744 |
| 6,353,600 | B1 | * | 3/2002 | Schwartz et al. ........... | 370/328 |
| 6,356,544 | B1 | * | 3/2002 | O'Connor .................... | 370/353 |
| 6,389,464 | B1 | * | 5/2002 | Krishnamurthy et al. ... | 709/220 |
| 6,400,730 | B1 | * | 6/2002 | Latif et al. .................. | 370/466 |
| 6,434,619 | B1 | * | 8/2002 | Lim et al. .................... | 709/229 |
| 6,532,088 | B1 | * | 3/2003 | Dantu et al. ................. | 398/43 |
| 6,574,216 | B1 | * | 6/2003 | Farris et al. ................. | 370/352 |
| 6,594,279 | B1 | * | 7/2003 | Nguyen et al. .............. | 370/468 |
| 6,662,221 | B1 | * | 12/2003 | Gonda et al. ................ | 709/223 |
| 6,718,141 | B1 | * | 4/2004 | deVette ......................... | 398/82 |
| 2003/0091037 | A1 | * | 5/2003 | Latif et al. ................... | 370/355 |

FOREIGN PATENT DOCUMENTS

| | | | | |
|---|---|---|---|---|
| EP | 0986226 A2 | * | 6/2000 | ........... H04L/29/06 |
| EP | 1089506 A2 | * | 4/2001 | ........... H04L/12/66 |
| GB | 2 278 979 | | 12/1994 | |

OTHER PUBLICATIONS

Goralski, *Sonet*, pp 180–183.

* cited by examiner

Primary Examiner—Saleh Najjar
(74) Attorney, Agent, or Firm—Barnes & Thornburg

(57) ABSTRACT

To provide a graphic user interface, supported by HTML or Java script, to a personal computer (102) for the control of SONET/SDH network elements (106), an RS-232 port of a PC is used to establish a PPP session to a remote access server, RAS (122). The network element (106) is therefore configured to imitate a modem, and to route PPP packets into its related management system across an optical ring (12). The management system may include an intermediate network manager (120) and a DHCP server (124). Once legitimacy of the PC is established through the IP session, the PC is provided with an IP address to invoke the PC's IP stack. Subsequently, IP is communicated across the PPP session, with the RAS (120) configured to terminate the PPP session and forward IP packets into an IP network (128). IP packets (131), received at a web server (140), are converted into command line interface (CLI) messages 135 and are sent directly to the network manager (120) within an IP packet. The network manager (120) terminated the IP packet and re-packages the CLI messages into an optical carrier format (140) for relay to an addressed network element (106). The addressed network element (106), which is responsive to the CLI messages from a management perspective, then alters its set-up or functionality accordingly. Complex text-based CLI instructions are thus avoided by a field-based engineer through the use of a GUI supported by a PC having web-browser capabilities, with an typical architecture shown in FIG. 2.

30 Claims, 4 Drawing Sheets

OPTICAL COMMUNICATION NETWORK AND METHOD OF REMOTELY MANAGING MULTIPLEXERS

BACKGROUND TO THE INVENTION

This invention relates, in general, to an optical communication network and method of remote device management therein, and is particularly, but not exclusively, applicable to the management control and set-up of add-drop multiplexers (and the like) associated with networks that make use of a synchronous optical network (SONET) or synchronous digital hierarchy (SDH) optical communication environment which are managed or maintained by service providers.

SUMMARY OF THE PRIOR ART

The expansive bandwidth available in optical networks continues to be reaped and developed in the drive to support every increasing demand for high-speed, high capacity and reliable communication capabilities. Indeed, optical networks provide an ideal transport system for interconnecting remotely separated communication networks, whilst also providing an ability for traffic, both voice and data, to be captured and processed, if desired, an intermediate nodes between the networks. Hence, terrestrially-based optical network architectures are relatively flexible since they fundamentally provide a system backbone that can be trapped and expanded through the inclusion of ingress-egress interface apparatus, such as add-drop multiplexers, routers and the like.

As will be understood by the skilled artisan, an optical network, often in the form of a ring (having interconnected spurs and arcs), will generally contain a plurality of add-drop multiplexers (ADMs) that each interact to provide path selectivity. Essentially, each ADM is coupled to some form of device, such as a private branch exchange (PBX) or data router, with the ADM functioning to convert data signals between a digital electrical domain and an optical domain. Specific detail of the translation and multiplexing function will be readily appreciated by the skilled addressee, with it being suffice to indicate that the conversion and multiplexing processes generally requiring the introduction of control overhead (used internally within the optical network for clock synchronisation, alignment and error correction, for example).

Ideally, customers wishing to alter or invoke functionality within an ADM, router or the like, desire use of a simple and readily understandable program language. Generally, however, this is not the case and a skilled engineer, visiting a peripheral device, fluent in the program language of the peripheral device is presented with a complex and abstract set of commands or instructions that difficult to interpret/ conceptualise. Presently, therefore, the customer cannot rely on any unskilled labour to implement changes in peripheral equipment functionality and present signalling schemes (through the optical domain and an IP network) are unable to support a graphic user interface (GUI) that would otherwise provide an intuitive/interactive control interface.

In summary, multiplexers and the like are presently managed through one of two mechanisms, namely: i) remotely over an open standards interconnect (OSI) protocol; or ii) through a text-based language driven from a local management control point, principally an engineer's laptop computer. In the former respect, the use of internet protocol (IP) language would clearly be preferred but OSI isn't IP compatible, whereas the latter stance is tinged by a practical competent engineer resourcing problem.

SUMMARY OF THE INVENTION

According to a first aspect of the present invention there is provided a method of managing a network element of a communication system from a remote management unit, the network element having a network address and being operationally configurable by a management system language, the network element coupled to a network manager through an optical communication network and wherein the network manager has an associated remote access (RAS) function providing an interface between the optical communication network and an IP network supporting a management server, the method comprising: at a first network element, in response to the remote management unit dialing the network address, simulating a modem response to establish a data connection to the remote management unit; establishing a PPP session between the remote management unit and the remote access function; invoking an IP stack in the remote management unit to support communication of IP data over the PPP session and across the IP network, the IP data pertaining to support of a management control function within the management server; interpreting the IP data at the management server and, in response thereto, generating control instructions for a second network element in the management system language; sending the control instructions to the second network element via the network manager and through both the IP network and the optical communication network; and altering an operational configuration of the second network element according to the control instructions.

In a preferred embodiment, the method further comprises: assigning an IP address to the remote management unit in the PPP session.

Preferably, the method further comprises: terminating the PPP session at the remote access function and relaying the IP data to the management server through the IP network.

In one embodiment, the method comprises: notifying the remote management unit of an effect, if any, of the command instructions on the second network element, wherein said notifying occurs via a reverse path via the network manager and through both the IP network and the optical communication network.

The first network element may be the second network element.

In another embodiment, the method comprises: establishing a graphic user interface (GUI) at the remote management device, the GUI supported by IP data transmissions from the management server via the RAS function and across the IP network and the optical communication network.

It is further desirable to action an authentication procedure in the PPP session prior to invoking the IP stack at the remote management unit.

Typically, the management server is a web-server and the remote management unit is a PC having a web-browser application.

In another aspect of the present invention there is provided a communication system comprising: at least one network element having a network address and being operationally configurable by a management system language; a network manager coupled to said at least one network element through an optical communication network and wherein the network manager has an associated remote access (RAS) function providing an interface between the optical communication network and an IP network; a management server coupled to the IP network; and a remote management unit for managing said at least one network element, the remote management unit connectable, in use, to a first network element through a serial data port; and wherein: a) said first network element includes a controller-memory combination arranged to simulate a modem function, the controller-memory combination operationally responsive to incident dialled digits corresponding to an associated network address, said incident dialled digits received on a serial data port connectable, in use, to the remote management unit and such that a data connection is established, in use, to the remote management unit by virtue of the simulated modem functions; b) the management server includes a controller-memory combination coupled, in use, to: i) the first network element via the RAS function and through both the IP network and the optical communication network; and ii) directly to the network manager through the IP network; the controller-memory combination arranged to communicate IP data to the remote management unit and to interpret IP data received from the remote management unit, said IP data pertaining to support of a management control function within the management server, and wherein the controller-memory combination is further arranged to translate management control function commands, received as IP data from the remote management unit via the RAS function, into command instructions of the management system language for communication directly to the network manager; and c) the network manager includes a controller-memory combination arranged to provide an optical transport mechanism for packaging the command instructions of the management system language for communication to a second network element, the command instructions arranged to alter an operational configuration of the second network element.

In another aspect of the present invention there is provided a network element connectable, in use, to an optical communication system, the network element comprising: a controller-memory combination arranged to simulate a modem function, the controller-memory combination operationally responsive to incident dialled digits corresponding to a network address associated with the network element; a serial data port for receiving said incident dialled digits, said serial data port connectable, in use, to the remote management unit; and wherein a data connection is established, in use, to the remote management unit by virtue of the simulated modem function;

The network element is preferably operationally configurable by a management system language communicated in a downstream direction to the network element from a management server.

In a further aspect of the present invention there is provided a management server for coupling to an IP network, the management server comprising: a controller arranged to communicate, in use, IP data to a remote management unit and to interpret IP data received from the remote management unit, said IP data pertaining to support of a management control function within the management server; and a memory storing a mapping of management control function commands into command instructions of a management system language operable to cause functional alteration of a network element; the controller, in use, operational in responsive to management control function commands, received as IP data from a remote management unit via a remote access service function, and wherein the controller operates to cause translation of management control function commands into corresponding command instructions for communication directly to a network manager coupled, in use, to the network element through the IP network.

The memory stores a graphic user interface (GUI) and the controller is arranged to communicate the graphic user interface to the remote management unit within IP data via the remote access service function.

In yet another aspect of the present invention there is provided an optical network manager having an associated remote access (RAS) function, the optical network manager connectable, in use, to at least one network element through an optical communication network, the RAS function providing a signalling interface between the optical communication network and an IP network, the optical network manager comprising: a controller arranged to provide termination of a PPP session, incident thereto across the optical communication network, carrying IP data; the RAS function co-operating with the controller to extract and communicate IP data from the PPP session to an IP network connectable thereto and wherein the controller is further arranged to package IP data supporting a graphic user interface into a PPP session; the controller further arranged to provide an optical transport mechanism for packaging command instructions of a management system language for downstream communication to said at least one network element, the command instructions received, in use, from a management server and wherein the command instructions are arranged to alter an operational configuration of the said at least one network element.

In still yet another aspect of the present invention there is provided a method of providing a control interface to a remote management computer in a mixed optical and IP-based network, the method comprising: at an ingress/egress point in the optical network, receiving dialled digits corresponding to a network address of the ingress/egress point; simulating a modem response function in responsive to the received dialled digits; and establishing a serial connection supporting IP-traffic to the remote management unit consequential on the simulated modem response function.

Another aspect provides a method of providing an interactive graphic user interface to a remote management computer across interconnected optical and IP networks, the graphic user interface providing a configuration management tool to the remote management computer, the method comprising: establishing an IP session across the interconnected optical and IP networks; and providing the graphic user interface to the remote management computer using IP datagrams.

In still yet a further aspect of the present invention there is provided a method of controlling configuration of a network element in an optical communication system, the method comprising: mapping management control function commands, received as IP data from a remote management computer, into command instructions of a management system language operable to cause functional alteration of a network element; and sending the command instructions directly to a network manager coupled, in use, to the network element through the IP network.

According to a further aspect of the present invention there is provided a computer program product for control intelligence of a communication system, the control intelligence arranged to manage a network element from a remote management unit, the network element having a network address and being operationally configurable by a management system language, the network element coupled to a network manager through an optical communication network and wherein the network manager has an associated remote access (RAS) function providing an interface between the optical communication network and an IP network supporting a management server, the computer program product comprising: code that causes the simulation of a modem response, said code responsive to a dialled network address associated with a first network element; code that causes establishment of a data connection to the remote management unit in response to the simulation of the modem response; code that causes the establishment of a PPP session between the remote management unit and the remote access function; code that invokes an IP stack in the remote management unit to support communication of IP data over the PPP session and across the IP network, the IP data pertaining to support of a management control function within the management server; code that interprets the IP data at the management server and, in response thereto, generates control instructions for a second network element in the management system language; code that causes the sending of the control instructions to the second network element via the network manager and through both the IP network and the optical communication network, whereby an operational configuration of the second network element is altered according to the control instructions; wherein the codes reside in a computer readable medium.

In another aspect of the present invention there is provided a computer program product for a controller of a network element in a mixed optical and IP-based network, comprising: code that directs the controller to simulate a modem response function in responsive to receipt of dialled digits from a remote management computer; and code that directs the controller to establish a serial connection supporting IP-traffic to the remote management unit consequential on the simulated modem response function; wherein the codes reside in a computer readable medium.

In still yet a further aspect of the present invention there is provided a computer program product for a controller of a management server providing an interactive graphic user interface to a remote management computer across interconnected optical and IP networks, the graphic user interface providing a configuration management tool to the remote management computer, the computer program product comprising: code that supports an IP session across the interconnected optical and IP networks; and code that directs the controller to provide the graphic user interface to the remote management computer using IP datagrams; wherein the codes reside in a computer readable medium.

In another aspect of the present invention there is provided a management server comprising: means for mapping management control function commands packaged in internal protocol into command instructions of a management system language operable to cause functional alteration of a network element; a controller arranged to exchange, in use, IP data to establish a control user interface for control of the network element and wherein the controller operates to cause translation of management control function commands into corresponding command instructions for communication to the network element.

One particular aspect of the present invention provides a computer program product for a controller of a management server operational responsible for controlling configuration of a network element of an optical communication system, the computer program product comprising: code that directs the controller to map management control function commands, received as IP data from a remote management computer, into command instructions of a management system language operable to cause functional alteration of a network element; and code that directs the controller to send the command instructions directly to a network manager coupled, in use, to the network element through the IP network; wherein the codes reside in a computer readable medium.

The various aspects are able to benefit from a mixing and matching of preferred features, as will be readily appreciated.

The present invention therefore makes use of one of only two ways of getting IP from a standard PC, namely through the use of a modem connected to an RS-232 serial port, rather than from an ethernet port.

Advantageously, the present invention provides a system in which a standard personal computer (PC) or personal digital assistant (PDA), such as a laptop, having a conventional web-browser application can access a web-based graphic user interface (GUI) to orchestrate functional control of an ADM or the like. Essentially, therefore, the present invention can be controlled to provide a virtual web-server within peripheral (e.g. ADM) equipment, with IP connectivity through the network supporting remote control of the peripheral equipment. Beneficially, the present invention provides a simplified user interface for functional control of remote equipment within an optical domain, with interaction through the interface simplified and generally intuitively based. With the PC otherwise unmodified, no IP-based language understanding needs to be embedded within the PC and hence greater management flexibility is provided to the service operator through their ability to make use of any web-browser supported on a standard PC operating platform. Indeed, with the service provider able to make use of any standard PC, a multiplicity of service terminals are available to the service provider by virtue of their typical prior investment in PCs for office use.

Beneficially, the present invention avoids the requirement of having to support web-based servers at each peripheral equipment node within a network, with the present invention providing backwards compatibility and future system evolution. Moreover, the present invention limits the cost of manufacture of peripheral equipment having increased management control functionality, with existing equipment up-gradeable through a software release (either in the form of a computer program product, such as a CD ROM) or through software download through the network.

A further advantage is that the present invention allows use of PC to control the set-up and functionality of either directly connected or remote peripheral equipment within a SONET/SDH environment.

The present invention further provides a mechanism of managing legacy non-IP SONET or SDH network elements using an IP based management tool, i.e. a PC with web-browser.

In overview, the present invention provides web-based management of SONET or SDH network elements, irrespective of whether such network elements support IP within their respective digital communication networks.

BRIEF DESCRIPTION OF THE DRAWINGS

An exemplary embodiment of the present invention will now be described with reference to the accompanying drawings, in which.

DETAILED DESCRIPTION OF A PREFERRED EMBODIMENT

Figure 1:
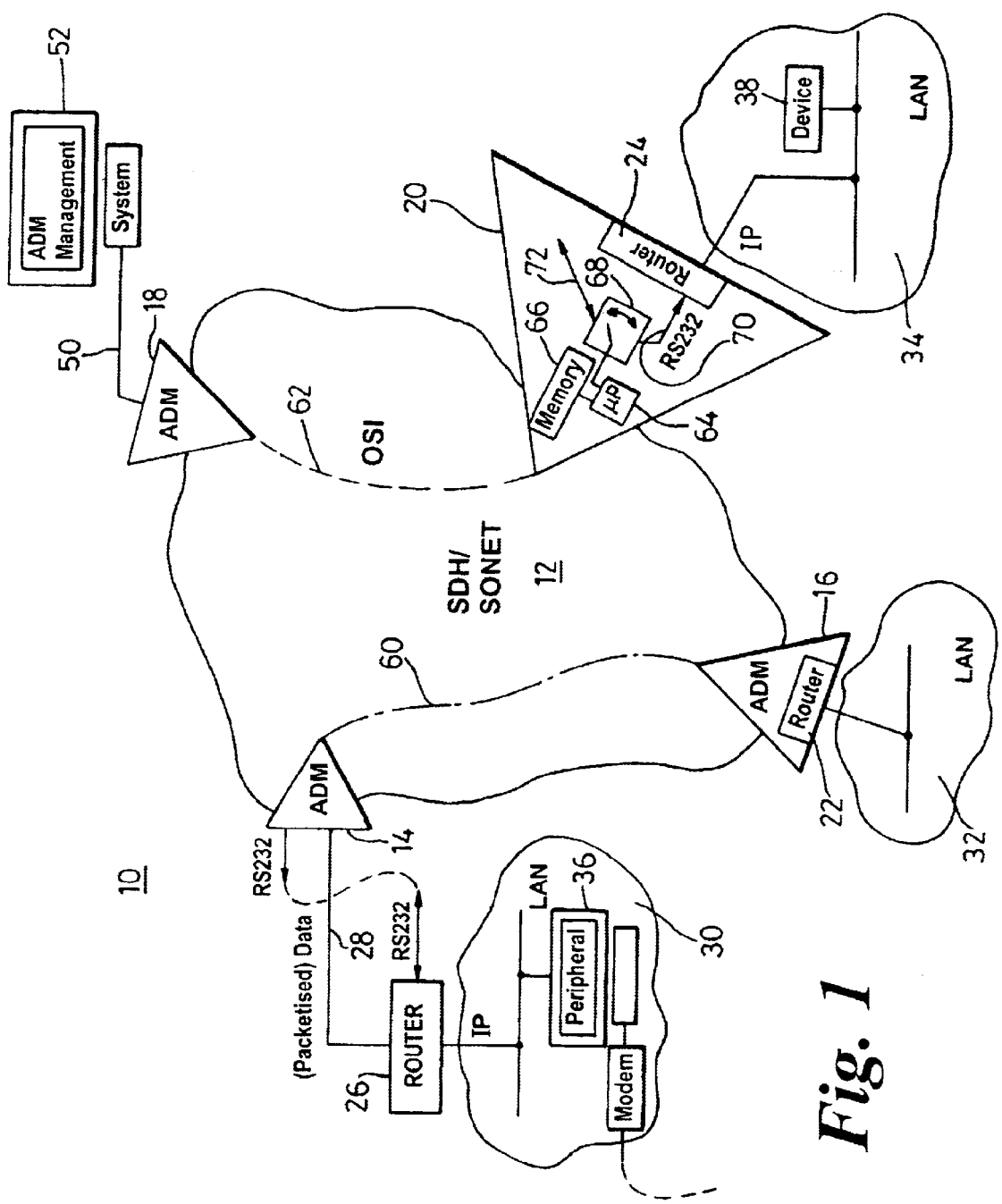
FIG. 1 is an overview representation of an optical communication network that may be adapted to support the present invention.

FIG. 1 is representation of an optical communication network 10. Generally, the optical communication system 10 has a SDH/SONET ring architecture 12 (or functional equivalent) that is accessed by a plurality of ingress and egress points, typically add-drop multiplexers 14–20. The ADMs may contain integral routers 22–24 (such as ADMs 16 and 20), although they may equally be of conventional design where a separate router 26 is coupled to the ADMs through a leased line 28. Local area networks (LANs) 30–34 are generally supported from the ADM or router, with peripheral devices 36–38 having access to the optical communication system 10.

The optical communication network 10 further includes an ADM 18 providing an interface, via an OSI LAN 50 (for example), to an ADM management system 52.

FIG. 1 also shows two exemplary connection paths (i.e. allocated communication resources) through the optical communication network 10, namely a data path 60 between two LANs (possibly representing a distributed customer system) and a control path 62 realised using D-bytes of an OSI connection. The control path 62 therefore connects the ADM management system 52 to, in this case, an ADM 20.

The ADM contains a microprocessor 64 (or equivalent form of device controller) arranged to perform protocol translations and a memory 66 arranged to store protocol translation and operational instructions. The microprocessor 64 of each peripheral device (such as router ADM combination 20) may be further coupled to a switching gate 68 that supports data transmission to either an RS-232 path 70 or an existing internal configuration channel 72. The switch is generally responsive to user commands issued by the ADM management system 52, although it could equally be message-sensitive.

Figure 2:
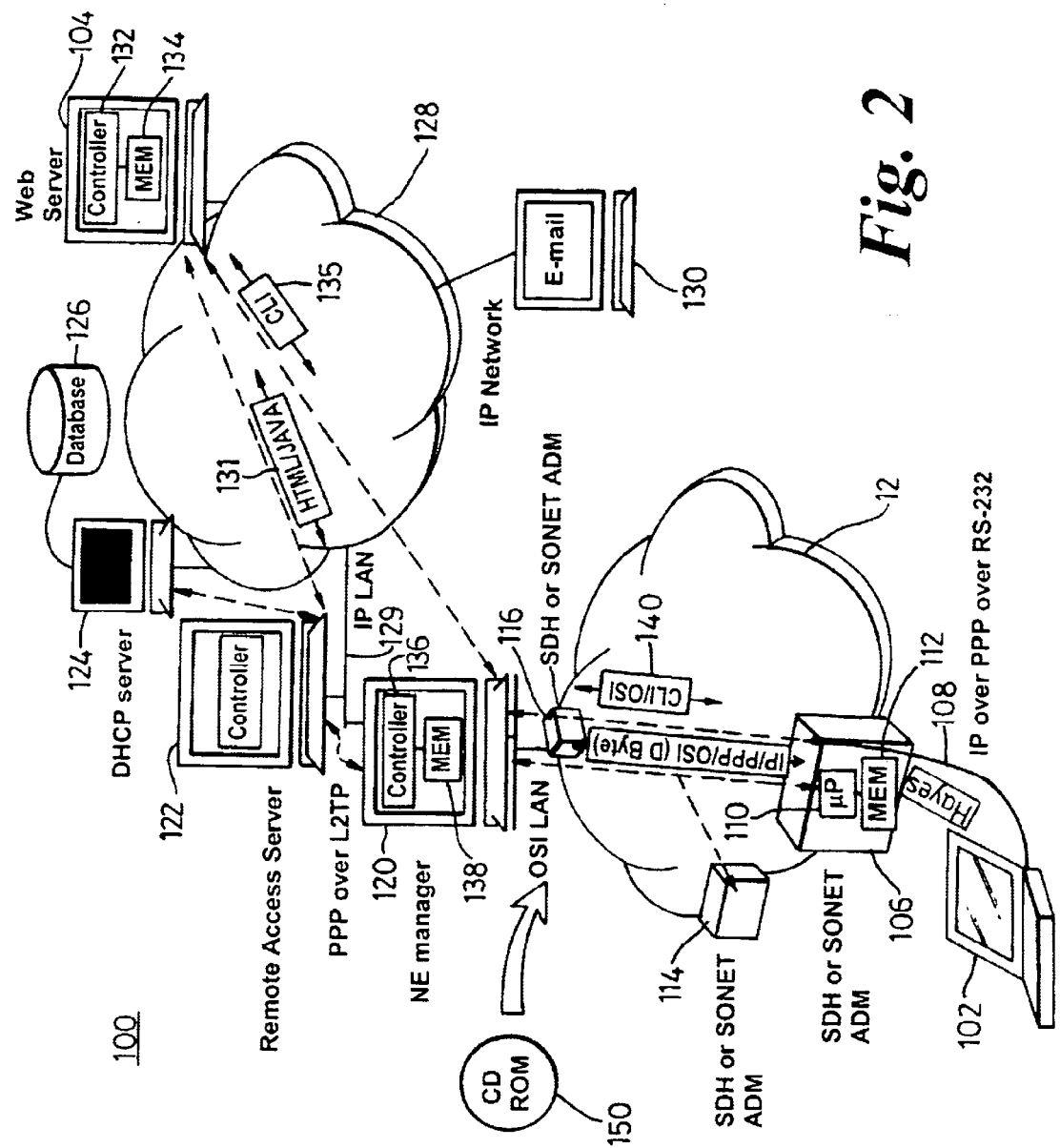
FIG. 2 is a detailed representation of a network architecture arranged to support the concepts of various embodiments of the present invention.
Figure 3A:
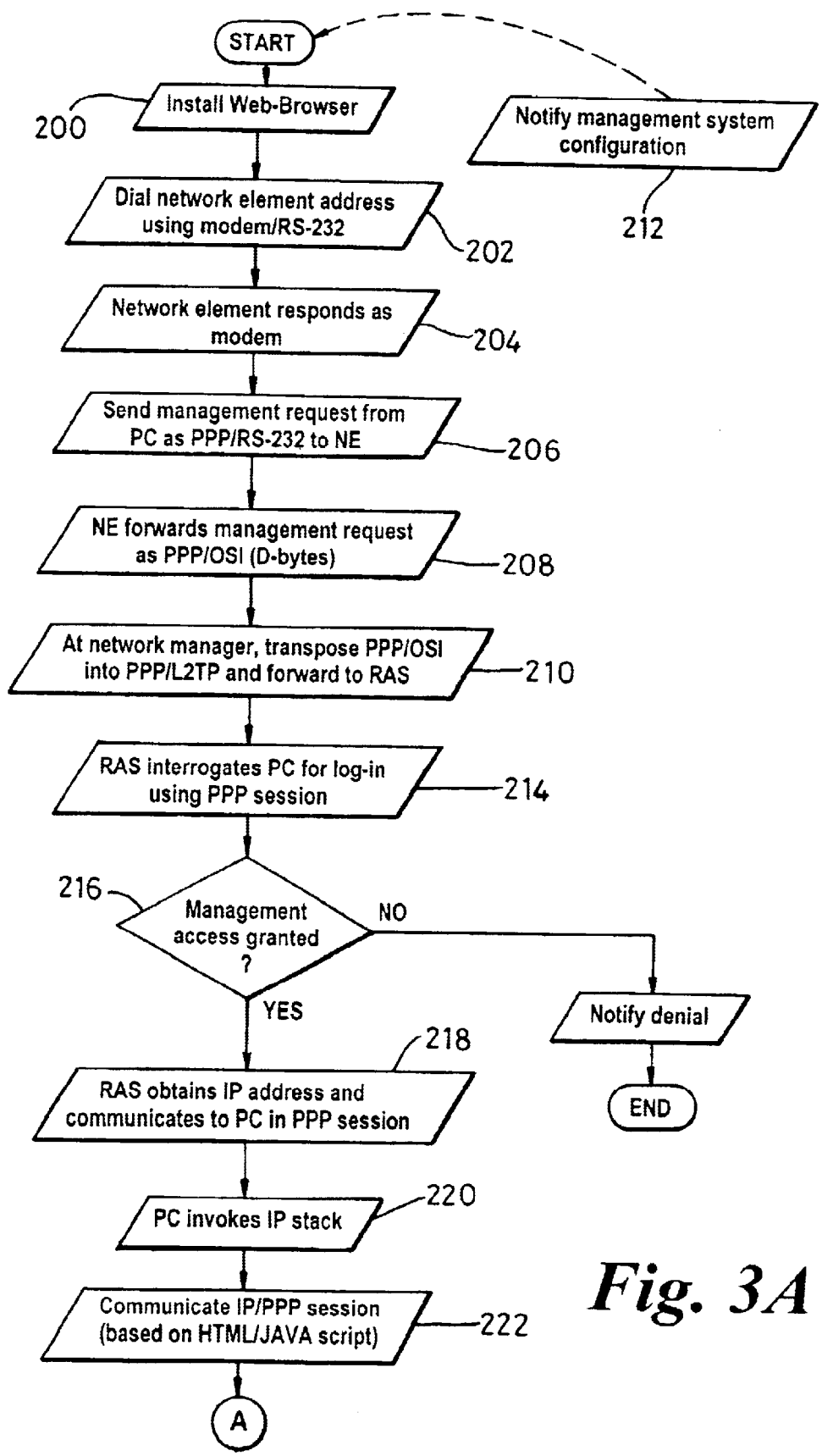
FIGS. 3A and 3B show a flow diagram illustrating a preferred set-up regime for peripheral device management according to the present invention.
Figure 3B:
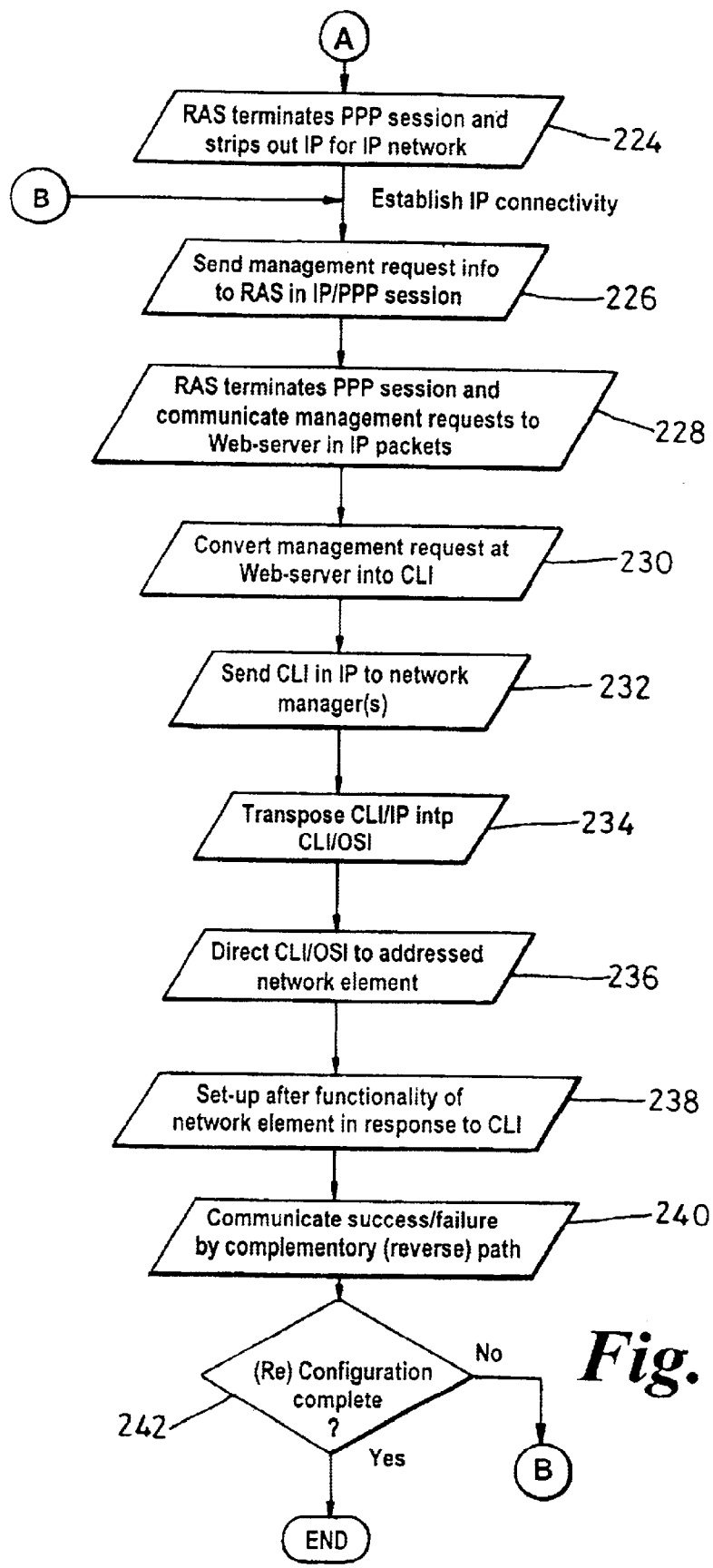

Turning now to FIG. 2, there is shown a detailed representation of a network architecture 100 (together with typical connection paths and associated protocols) arranged to support the concepts of various embodiments of the present invention. FIG. 2 should be constructed in conjunction with the flow diagram of FIG. 3 to obtain an enhanced understanding of the preferred connection and management regime of the present invention.

The system operates on the basis of an engineer having a standard PC 102 equipped 200 with a web-browser and subject to the engineer having access to an address of an appropriately configured web-server 104. The PC 102 is connected, in use, to peripheral equipment 106 (e.g., an ADM) through an RS-232 connection. Generally, the RS-232 connection 108 will be a direct connection. The peripheral equipment 106 contains a controller 110 (labelled μP) coupled to memory 112, which may be discrete or cached. The peripheral equipment 106 is connected to a SONET/SDH ring architecture supporting other interconnected ADMs 114–116 or the like.

The engineer selects the address (i.e. telephone number for the web-server 104) and communicates the to (i.e. dials) 202 the ADM 106. The ADM (particularly the controller 110 and memory 112) is configured to respond 204 in a like way to a conventional modem, with the memory 112 therefore storing a database of Hayes commands (or their equivalent). In other words, the ADM is configured to simulate modem functionality by returning Hayes modem commands (or the like) back to the PC 102 over the RS-232 connection 108, thereby fooling the PC into believing that it is connected to a modem.

With respect to the Hayes modem commands, the ADM 106 is generally configured to respond in the following way:

| Input from PC | Response from network peripheral/element |
|---|---|
| AT<cr> | send "ok" to PC |
| ATE0V1<cr> | send "ok" to PC |
| ATDTxx . . . x<cr> | ignore xx . . . x, send "ok" to PC, send PPP to management system |
| ATH<cr> | send "ok" to PC |
| ATZ<cr> | send "ok" to PC, stop sending PPP to management system |

Clearly, with a plurality of web-servers, each may offers/support slightly different applications operationally selectable from the PC 102. Putting this another way, a preferred embodiment of the present invention envisages PPP (point-to-point protocol) to a specific network manger 120, although there could be a choice (based, for example, on dialled address/phone number).

As regards new peripheral equipment, for security and simplicity, it is preferred to limit the transmit of PPP/OSI to restricted network managers (associated with the ADM or the like). Indeed, a new ADM will not appreciate or be aware of the address details of its associated network manager until such time as the service provider or engineer first advises the ADM of its network management neighborhood. Consequently, the PC will not achieve connectivity with a remote access server (RAS) and the connection to the web-server will fail, thereby providing an initial level of operational security. However, a technician is still be able to use a command line interface (management) language from a remote (hooked-in) PC to alter or invoke ADM functionality.

In response to the PC 102 now being fooled into believing that it has a valid modem connection, the PC 102 sends 206 a management request in the form of PPP messages to the ADM 106. From a PC's perspective, the ADM therefore takes the guise of a modem and appears to have initiated a call to a Remote Access Server.

With the ADM 106 aware of its management system (by virtue of a pre-stored connection/address map), the ADM 106 is configured to forward 208 such PPP messages (typically PPP packaged into D-bytes of an OSI overhead) to an interconnected network manager 120 (via, perhaps, other ADMs or interconnected network managers). The network manager 120 receiving 210 PPP messages is also aware 212 of its management system (e.g. an interconnected remote access server, RAS, 122) and is therefore able to communicate the PPP messages (in a suitably translated format) to its RAS. For example, the PPP/OSI incident to the network manager 120 may be converted 210 into a wireline supported protocol to the form L2TP/IP, as specified in RFC2611.

The RAS may be an integral function within the network manager, with the RAS serving to terminate PPP sessions, as will be understood.

More specifically, the ADM sends and receives PPP/OSI to the network manager 120 through the use of TSAP identifies, which TSAP identities identify the computer application to which data packets are to be referred.

At this point, the RAS 122 is arranged to ask 214 the PC 102 for log-in and password information to confirm/deny access 216, with communication between the RAS 122 and PC 102 being in the form of PPP/L2TP, PPP/OSI and PPP/RS232. Subjected to the RAS 122 being satisfied that the PC 102 is legitimate, the RAS 122 communicates 218 an IP address back to the PC 102 using a PPP session (realised/supported by PPP/L2TP, PPP/OSI and PPP/RS232). The RAS 122 can obtain the IP address from its internal memory (not shown for the sake of clarity) or through communication or arbitration with a DHCP server 124 that is arranged to allocate IP addresses from its associated database 126. In other words, the RAS 122 operates as an authentication server and obtain/administers the allocation of an IP address (in a similar way to conventional Internet access for a household environment).

Additionally, the RAS 122 may use (i.e. delegate) an extended or dedicated authentication server to verify legitimacy of the PC log-in procedure. Of course, network manager functionality may be augmented to avoid the extended chained interconnection to an RAS and a DHCP server.

With the PCP 102 now armed with an IP address, an IP stack within the controller 110 of the PC is actuated 220, which IP stack supports the transmission of IP/PPP to the RAS 122 in a PPP session. In other words, the PC can now undertake 222 an IP session that effectively leads to web-server interconnection (and information exchange) through use of the PC's web-browser.

The RAS 122 now acts as to terminate 224 a PPP session and so extracts IP packets and inserts them into an IP network 128 via an IP LAN 129. The IP network 128 couples the RAS 122 to the web-server 104. There is, at this point IP connectivity between the PC 102 and the IP network 128, with the PC 102 therefore able to see all artefacts or peripheral equipment, such as e-mail servers 130 or other service provider, on the IP network 128. The IP network 128 may be proprietary in nature. With the PC able to view the entire IP network 128, some additional benefit is gleaned through the present invention improving communication access to a field engineer.

With the PC containing a bookmark to the web-server, the PC is now able to send 226–228 IP packets to the web-server. The IP packets are communicated to the web-server 104 by a process of: IP/PPP/RS-232 converted at the ADM to IP/PPP/OSI over D-byte overhead and then conversion to IP/PPP/L2TP at the network manager for termination at the RAS 122 into IP packets for the IP network 128.

The PC 102 is now able to obtain access to a GUI (supported at the web-server 104) through the sending of hyper-text mark-up language (HTML)/Java script (or a functionally equivalent language) 131 bi-directionally across the optical network 12 and the IP network 128 between itself and the web-server 104. Clearly, the HTML/java script 131 can support the provision of a graphic user interface to the PC 102 in order to provide a menu-driven option for controlling peripheral equipment, e.g. ADM 106.

Once a positive command has been communicated using IP (HTML/Java script) connectivity between the PC 102 and the web-server 104, a controller 132 within the web-server 104 accesses its associated memory 134 to convert 230 the HTML/Java script (communicated in IP packets) into an appropriate command line interface language, such s CLI or TL1. CLI (or equivalent) messages 135 are communicated 232 over IP to the network manager 120. A controller 136 (co-operating with a translation memory 138) within the network manager 120 then transposes 234 the CLI/IP messages 135 into CLI/OSI messages 140 to an addressed 236 ADM 106, whereby the CLI/OSI is interpreted and actioned 238 by its controller 110 to set-up or alter functionality of the ADM 106.

After network element (e.g. ADM) functional alteration, the network element preferably uses a complementary reverse path (via the web-server) to notify 240 the PC of success/failure.

Clearly, once IP connectivity has been established, any number of individual functional alterations can be accomplished 242 by an engineer at the control of the GUI on the PC, with such changes being to directed to one or different network elements.

In overview, according to the present invention, a PC is therefore able to configure peripheral equipment using a point and click GUI without having specific GUI functionality located within the peripheral equipment. In essence, a web-browser in a PC is able to access the web-server via the RAS, with the web-server having control intelligence able to convert between point and click GUI into a text/based management configuration language used within peripheral equipment of the SONET/SDH network.

In terms of operational performance, the PC (in view of its modem connection to the ADM or the like) will typically have a restricted bandwidth, e.g. 9600 bits per second (bps) or 1920 bps, although higher (and lower) baud rates are clearly possible.

Changes in ADM functionality to support CLI punch-through according to the preferred embodiment of the present invention may be realised by a software upgrade to the ADM.

Should the system of the present invention suffer data communication network (DCN) failure, i.e. connection break between the ADM and the management network manager, connectivity to the web server 104 cannot be established and GUI control inhibited. However, the technician/engineer is able to revert to use of a CLI session to set up the peripheral equipment.

In the present invention, it is has been appreciated that a web-server does not need to be placed within every network manager to provide an GUI (which would prove relatively expensive), but instead the web-server can be centrally located and accessed over the DCN. Indeed, there has been a realisation that a Windows™-based PC can communicate with a web-server if an intermediate network manager can forward PPP packets over the DCN, irrespective of whether the DCN is IP-based or not.

A preferred embodiment of the present invention further contemplates the remote management of devices through the GUI provided to the PC 102 or the like. For example, the GUI may be arranged to provide a screen selectable feature which identifies interconnected optical network ingress/egress points that can be managed via the web-server in response to HTML/Java script sent to the web server on the back of a PPP session.

It will, of course, be appreciated that the above description has been given by way of example only and the modifications in detail may be made within the scope of the present invention. For example, whilst the preferred embodiment of the present invention considers use of D-bytes within an OSI environment, the present invention should not be construed as being limited to such a transfer mechanism. Moreover, the present invention has general applicability in the control and set-up of all devices, e.g. ethernet switches, asynchronous transmission mode (ATM) switches, a PABX (Private Automatic Branch exchange), another vendors co-located ADM or a cellular base station.

Having regard to the serial connection from the ADM (in the most basic sense), it will be appreciated that the RS-232 is eqivalent to V.24, although it will be appreciated that other forms of output could be used, e.g. V.11. Similarly, whilst the preferred embodiment refers to an optical system comprising ADMs, these could be substituted by equivalent forms of system and device, such as regenerators and SDH/SONET radio, and so the term ADM (and optical network) should be considered and construed in a broad sense.

In the context of the present invention, it will be appreciated that the modem connection between the laptop 102 and the network element (e.g. SDH ADM 106) may take a number of equivalent forms. Indeed, the present invention may also be employed in a wireless IP environment, with the web-server maintaining IP-command line language translation provisions. However, a wireless connection supporting management control of a network element may be subject to abuse and so authentication is clearly required before provision of a management control GUI over wireless IP. Furthermore, in the context of dialled access, it will be appreciated that this term should be constructed broadly to include various, alternatives forms of connection establishment procedure (as will readily be appreciated).

Improved operational functionality can be provided to the system through the use of software upgrade provided by wireline or wireless download or in the form of a computer program stored on a CD-ROM. Software upgrade is represented in FIG. 2 by the CD-ROM icon 150.

We claim:

1. A method of managing a network element in an optical network from a remote management unit, comprising the steps of:
   A) connecting the remote management unit to an optical network via a network node;
   B) communicating IP data from the network node to a network manager across the optical network using a network management channel, and communicating from the network manager across an IP network to a management server;
   C) at the management server, converting information received from the network manager into control instructions;
   D) communicating said instructions from the management server to the network manager; and
   E) using a network management channel to communicate said instructions from the network manager to a network element.

2. A method of managing a network element as claimed in claim 1, wherein step (A) comprises the steps of:
   at the remote management unit, dialling a network address associated with said network element; and
   at said node, simulating a modem response to establish a data connection to the remote management unit.

3. The method of managing a network element according to claim 2, wherein the data connection is a serial data connection.

4. A method of managing a network element as claimed in claim 1, wherein the network manager has an associated remote access function and step (B) comprises the steps of:
   establishing a PPP session between the remote management unit and the remote access function; and
   invoking an IP stack in the remote management unit to support communication of IP data over the PPP session and across the IP network, the IP data pertaining to support of a management control function within the management server.

5. The method of managing a network element according to claim 4, further comprising:
   assigning an IP address to the remote management unit in the PPP session.

6. The method of managing a network element according to claim 4, further comprising:
   terminating the PPP session at the remote access function and relaying the IP data to the management server through the IP network.

7. The method of managing a network element according to claim 4, further comprising:
   actioning an authentication procedure in the PPP session prior to invoking the IP stack at the remote management unit.

8. A method of managing a network element as claimed in claim 1, wherein step (C) comprises the step of:
   interpreting the IP data at the management server and, in response thereto, generating control instructions for said network element in management system language.

9. A method of managing a network element as claimed in claim 1, further comprising the step of:
   altering an operational configuration of the network element according to the control instructions.

10. A method of managing a network element as claimed in claim 1, wherein the optical network is a synchronous network.

11. A method of managing a network element as claimed in claim 1, wherein the network management channel comprises D-bytes of an open standards interconnect connection.

12. The method of managing a network element according to claim 1, further comprising:
   notifying the remote management unit of an effect, if any, of the command instructions on the network element, wherein said notifying occurs via a reverse path via the network manager and through both the IP network and the optical network.

13. The method of managing a network element according to claim 1, wherein the network node is the network element.

14. The method of managing a network element according to claim 1, further comprising:
   establishing a graphic user interface (GUI) at the remote management device, the GUI supported by IP data transmission from the management server via the network manager and across the IP network and the optical network.

15. The method of managing a network element according to claim 1, wherein the management server is a web-server and the remote management unit is a PC having a web-browser application.

16. A method of controlling configuration of a network element in an optical communication system, the method comprising:
   mapping management control function commands, received as IP data sent over a management channel of the optical communication system, from a remote management computer, into command instructions of a management system language operable to cause functional alteration of a network element; and
   sending the command instructions directly to a network manager through the IP network, wherein said network manager is coupled, in use, to the network element via an optical network management channel.

17. A computer program product in a computer readable medium arranged to perform the method of any of claims 1–16.

18. An optical network manager having an associated remote access (RAS) function, the optical network manager connectable, in use, to at least one network element through an optical network via a network management channel, the RAS function providing a signalling interface between the optical network and an IP network, the optical network manager comprising:
   a controller arranged to provide lamination of a PPP session, incident thereto across a network management channel of the optical network, carrying IP data; the RAS function co-operating with the controller to extract and communicate IP data from the PPP session to an IP network connectable thereto and wherein the controller is further arranged to package IP data supporting a graphic user interface into a PPP session;
   the controller further arranged to provide an optical transport mechanism for packaging command instructions of a management system language for downstream communication to said at least one network element, the command instructions received, in use, from a management server and wherein the control instructions are arranged to alter an operational configuration of the said at least one network element.

19. The optical network manager of claim 18, wherein the controller is further arranged to provide an IP address to a remote management unit in the PPP session.

20. The optical network manager of claim 19, wherein the controller is further arranged to action in authentication procedure in the PPP session prior to invoking an IP stack at the remote management unit.

21. A method of providing an interactive graphic user interface to a remote management computer access interconnected optical and IP networks, the graphics user interface providing a configuration management tool to the remote management computer, the method comprising:
   establishing an IP session across the interconnected optical and IP networks using an optical network management channel; and
   providing the graphic user interface to the remote management computer using IP datagrams.

22. A computer program product for control intelligence of a communication system, the control intelligence arranged to manage a network element from a remote management unit, the network element having a network address and being operationally configurable by a management system language, the network element coupled to a network manager through an optical network via a network management channel and wherein the network manager has an associated remote access (RAS) function providing an interface between the optical network and an IP network supporting a management server, the computer program product comprising:
   code that causes the simulation of a modem response, said code responsive to a dialled network address associated with a first network element;
   code that causes establishment of a data connection to the remote management unit in response to the simulation of the modem response;
   code that causes the establishment of a PPP session over the management channel of the optical network between the remote management unit and the remote access function;
   code that invokes an IP stack in the remote management unit to support communication of IP data over the PPP session and across the IP network, the IP data pertaining to support of a management control function within the management server;
   code that interprets the IP data at the management server and, in response thereto, generates control instructions for a second network element in the management system language;
   code that causes the sending of the control instructions to the second network element via the network manager and through both the IP network and the optical communication network, whereby an operational configuration of the second network element is altered according to the control instructions;
   wherein the codes reside in a computer readable medium.

23. A communication system comprising:
   an optical network having a network management channel;
   a network element coupled to said optical network;
   a network node coupled to said optical network;
   a network manager coupled to said network element through the optical network and wherein the network manager has an associated remote access (RAS) function providing an interface between the optical network and an IP network;
   a management server coupled to the IP network; and
   a remote management unit connectable, in use, to said network node,
   wherein said remote management unit is arranged to communicate IP data with said management server via said network management channel across said optical network; and
   wherein said management server is arranged to convert information received from said remote management unit into control instructions and to communicate said instructions to said network element via said network manager and said network management channel.

24. A communications system as claimed in claim 23, wherein the network element is the network node.

25. A communication system as claimed in claim 23, said network element having a network address and being operationally configurable by a management system language, and wherein said control instructions are formed in said management system language.

26. The communication system of claim 25, wherein the management system language is one of the CLI and TL1.

27. A communications system as claimed in claim 23, wherein said remote management unit is connectable, in use, to said network node through a serial data port.

28. A communications system as claimed in claim 23, wherein the network node includes a controller-memory combination arranged to simulate a modem function, the controller-memory combination operationally responsive to incident dialled digits corresponding to an associated network address, said incident dialled digits received on a serial data port connections, in use, to the remote management unit and such that a data connection is established, in use, to the remote management unit by virtue of the simulated modem function.

29. A communication system as claimed in claim 23, wherein the management server includes a controller-memory combination coupled, in use, to:
   the network node via the RAS function and through both the IP network and the optical network; and
   directly to the network manager through the IP network;
   the controller-memory combination arranged to communicate IP data to the remote management unit and to interpret IP data received from the remote management unit, said IP data pertaining to support of a management control function within the management server, and wherein the controller-memory combination is further arranged to translate management control function commands, received as IP data from the remote management unit via the RAS function, into command instructions of the management system language for communication directly to the network manager.

30. A communication system as claimed in claim 23, wherein network manager includes a controller-memory combination arranged to provide an optical transport mechanism for packaging the command instructions of the management system language for communication to the network element, the command instructions arranged to alter an operational configuration of the network element.

* * * * *